United States Patent [19]

Flohr

[11] Patent Number: 5,297,002
[45] Date of Patent: Mar. 22, 1994

[54] DEVICE FOR RAPID ATTACHMENT OF SERIALLY-MOUNTED ELECTRICAL APPARATUS

[75] Inventor: Peter Flohr, Kahl/Main, Fed. Rep. of Germany

[73] Assignee: Heinrich Kopp GmbH & Co. KG, Kahl, Fed. Rep. of Germany

[21] Appl. No.: 859,730

[22] PCT Filed: Aug. 5, 1991

[86] PCT No.: PCT/DE91/00634

§ 371 Date: Jun. 8, 1992

§ 102(e) Date: Jun. 8, 1992

[87] PCT Pub. No.: WO92/08264

PCT Pub. Date: May 14, 1992

[30] Foreign Application Priority Data

Oct. 29, 1990 [DE] Fed. Rep. of Germany ....... 4034307

[51] Int. Cl.$^5$ .............................................. H02B 1/20
[52] U.S. Cl. ................................................... 361/652
[58] Field of Search .................. 200/293, 294, 296; 248/225.1, 225.2; 361/331, 335, 346–348, 353–361, 376, 417, 419, 420, 427

[56] References Cited

FOREIGN PATENT DOCUMENTS

| | | |
|---|---|---|
| 1114880 | 10/1961 | Fed. Rep. of Germany ...... 361/376 |
| 7522267 | 1/1976 | Fed. Rep. of Germany . |
| 7533059 | 4/1976 | Fed. Rep. of Germany . |
| 7609710 | 9/1976 | Fed. Rep. of Germany . |
| 2639544 | 3/1978 | Fed. Rep. of Germany . |
| 2717216 | 11/1978 | Fed. Rep. of Germany . |
| 2946622 | 7/1980 | Fed. Rep. of Germany . |
| 2443789 | 7/1980 | France . |

*Primary Examiner*—Gregory D. Thompson
*Attorney, Agent, or Firm*—Collard & Roe

[57] ABSTRACT

In order to secure a series built-in unit on the section of a fitting rail (4) and to be able to detach it again therefrom and from the electric collector busbar (2, 5), in the region of a recess (13) on both side of the housing wall of the device is pivotably fitted a U-bracket-shaped coupling component (3) of elastic material which is divided by a slot (7) extending into the two U-arms of the frame-like widened connecting web into a supporting end (8) for the engagement of the fitting rail (4) and an actuating end (9) spring-loaded on the casing (1) lockable and unlockable by swinging in relation to the bearing position (6).

8 Claims, 1 Drawing Sheet

DEVICE FOR RAPID ATTACHMENT OF SERIALLY-MOUNTED ELECTRICAL APPARATUS

BACKGROUND OF THE INVENTION

1. Field of the Invention

The invention relates to a device for rapid attachment and removability of electrical serially-mounted apparatus on mounting rails.

2. The Prior Art

Such devices are used to allow simple assembly, exchange and resetting of switches, safety switches and control apparatus, combined in a permanent manner in domestic distribution systems and the like, as well as to hold them securely in position for ease of use when built into an electrical installation.

DE 25 23 197 03 discloses known snap sliders comprising slide member linearly displaceable against the force of a spring in order to provide complementary engagement behind a profile of the mounting rail. These slides have the drawback that the apparatus itself cannot be displaced transversely to the mounting rail, allowing it to be released and lifted out of its connection with an electrical bus bar. This type of attachment requires total dismantling of the existing bus bar in each separate case.

On the other hand devices which do not require removal of the bus bar in order to function, are expensively assembled from several separate parts and require a relatively powerful spring in order to ensure perfectly secure seating of the installed assembly when mounted in apparatus (cf. DE 34 43 540 01, DE 39 10 938 A1).

SUMMARY OF THE INVENTION

It is an object of the invention to simplify devices of this type with regard to their physical design, their capacity for assembly and their function or possible uses.

In comparison to the prior art devices, the device according to the invention for rapid attachment of electrical serially-mounted apparatus has the advantages of being reduced to a single one-piece coupling member, inherently elastic in design, between the assembly apparatus and its mounting rail, and which during manufacture may be simply, manually inserted into the outer surface of the finished apparatus, and thereafter is displaceably held between two specific engagement positions on the housing.

Thus, when the coupling member is in the engaged position, the respective assembly apparatus can be simply pressed manually on to the surface of the mounting rail and precisely secured there. Also the structure of the apparatus requires merely a transverse displacement of the electrical connector screw out of the bus bar. Thus, the coupling member will shift by itself from the locked position into the unlocked position, enabling the assembly apparatus to be lifted from the mounting rail. In addition, the design of its actuating end allows the coupling member, if necessary, to be shifted from the latched into the unlatched position using a tool supported against the casing. Thereafter it is possible simply to press the coupling member manually into the locked (engaged) position preparatory for assembly, or completing.

In one embodiment, the pins on the ends of both legs of the coupling member are hook-shaped to allow displaceable connection within the bearing holes, which are designed for this purpose as a slot. In order to simplify manual assembly, the pins are tapered in the direction of insertion, and if necessary with a zonal chamfering of the lower edges of the casing. Accordingly, the coupling member may be tightly inserted into the casing bearing, and then cooperate inherently elastically with the two engagement facilities in the housing.

In another embodiment, these engagement facilities comprise, on the sides of the housing, on the one hand recesses on the outer side, into which the coupling member can be forceably pressed manually, with two locking cams provided internally on the activating end of its web frame. On the other hand there is an externally-situated casing projection, which is in each case surrounded to provide a secure hold by a recess on the activating end of both legs of the coupling member.

In a further embodiment of the coupling member, the engagement end of its web frame is, in order to simplify manual pressing on to the hat profile of the mounting rail, laterally bevelled in a downward direction. The activating end of this web frame is designed to provide a secure hold on the exterior, or, in conjunction with the housing contour, is designed for the application of a tool.

It is also possible to locate the device either outside on one and/or the other clamp connector side of the assembly apparatus, or to house it functionally in an inwardly-extending casing recess in the lateral region of the clamp connector of an apparatus.

BRIEF DESCRIPTION OF THE DRAWINGS

In the accompanying drawing, the design according to the invention of the device for rapid attachment of any serially-mounted apparatus on a stationary mounting or support rail is illustrated and explained in detail by reference to a typical embodiment given by way of example. Shown are.

DETAILED DESCRIPTION OF PREFERRED EMBODIMENTS

Figure 1:
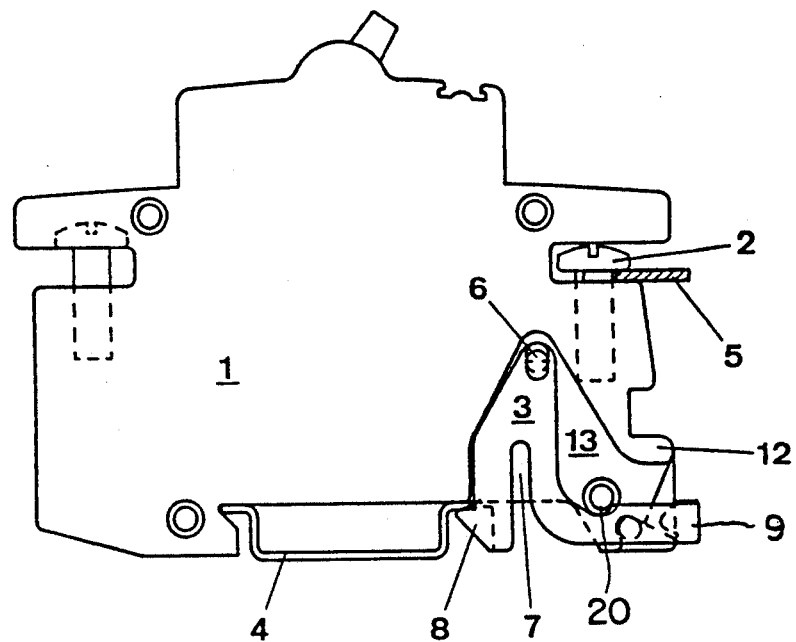
FIG. 1: the serially-mounted apparatus mounted on the support rail, with the attachment device locked.
Figure 2:
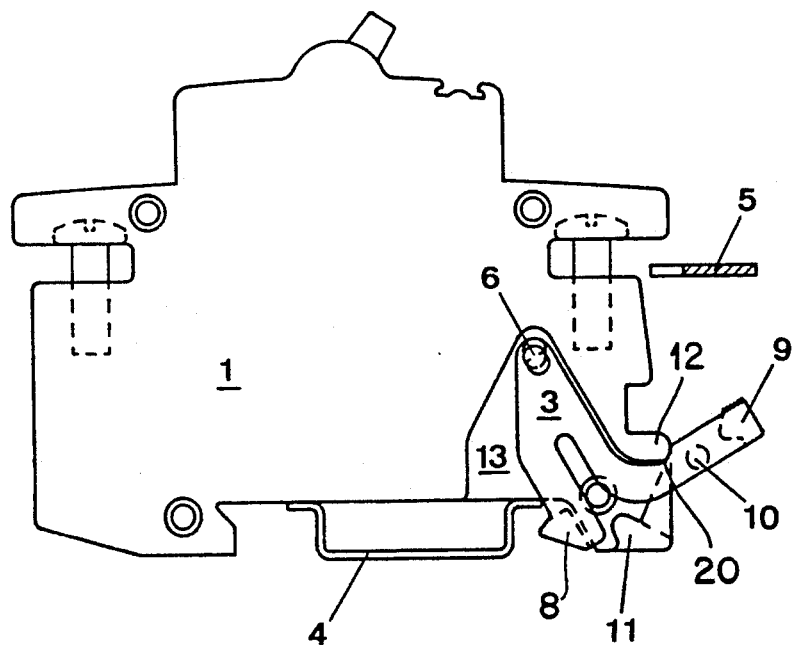
FIG. 2: the apparatus unlocked by lateral displacement and released from the bus bar connection.

As the drawing shows, the assembly apparatus with its housing 1 may be attached on the common support rail 4, and electrically connected to the bus bar 5, parallel thereto in the connector area, by the coupling member 3 provided on said housing beneath one of the connector clamps 2.

In this case the actual coupling member 3 is shown as a U-shaped arcuate plastic component, which is provided on its legs with hook-shaped pins for engagement in the bearing holes 6 on both sides of the housing 1.

Further, the coupling member 3 is subdivided, in the region of its frame-like extended connector web, by a slot 7 extending into the legs, into an engagement end 8 slidably extending over the surface of the support rail 4, and into an activating end 9 lockable in the end positions of the coupling member 3. For this purpose this activating end 9, opposite the slot-like extended bearing hole 6, is inherently resiliently angled and provided on the one hand with locking cams 10, extending inwards on both sides for engagement in corresponding recesses 11 on the side of housing 1, and on the other hand is provided at the top with a concavity 20 for securing on an externally-located housing projection 12.

Accordingly, during its assembly, the coupling member 3 is easily pushed from below with the pins bevelled for this purpose elastically on to the leg ends over the (if necessary) chamfered lower edge of the housing, and suspended in the bearing holes 6, in order to to provide the coupling member 3 thereafter, within the limits of the wall recesses 13 present on both outer sides of casing 1, with a pivotal locked position above the support rail 4. At the same time on the housing (10/11) itself, the coupling member is unlocked out of this position, releasing the support rail 4 and bus bar 5 in the region of the connector clamp 2 of the assembly apparatus, and to secure the coupling member 3 releasably also in this end position (at 12) on the housing 1.

I claim:

1. A device for rapid releasable attachment of electrical serially-mounted apparatus, said apparatus having a housing (1) having bearing holes formed therein on a mounting rail (4), comprising:
   a resiliently displaceable coupling member (3) on the housing (1) of the apparatus, for engaging the mounting rail;
   said housing having a wall recess (13) and said coupling member (3), being radially pivotable in the region of the wall recess (13) of the housing (1);
   said coupling member having the form of a U-shaped arc of elastic material having two legs on which inwardly-extending pins are attached for engagement in bearing holes (6) of the housing (1);
   said coupling member having a connector web which is provided on the longitudinal side with a slot (7) continuing into the two legs, for mutually subdividing the connector web into an engagement end (8) for securing on the mounting rail (4), and an activating end (9) inherently resiliently lockable on the housing (1) opposite the bearing holes (6).

2. A device according to claim 1,
   wherein the pins on the ends of the legs of the coupling member (3) are hook-shaped for movable engagement in the bearing holes (6);
   each of said bearing holes consisting of a slot, and said pins being tapered in the direction of engagement.

3. A device according to claim 1,
   wherein the housing (1) has corresponding recesses (11) on the sides thereof; and
   wherein the activating end (9) of the connector web has two internal locking cams (10) for pressing into said corresponding recesses (11) on the sides of the housing (1).

4. A device according to claim 1,
   wherein the slot (7) of the connector web continues into the two U-shaped legs of the coupling member (3), and the activating end (9) is angled outward relative to the engagement end (8).

5. A device according to claim 1,
   wherein the engagement end (8) of the connector web is beveled laterally for pressing onto the mounting rail (4).

6. A device according to claim 1,
   wherein said housing has an externally located projection (12); and
   wherein the activating end (9) of the connector web has means (20) for securely holding onto said housing projection (12).

7. A device according to claim 3,
   wherein the recess (11) is disposed, in narrow apparatus on a narrow side of the housing (1).

8. A device according to claim 3,
   wherein the recess (11) is disposed, in wider apparatus, within a recess extending inwardly on the underside into the housing (1).

* * * * *